United States Patent [19]

Syverson

[11] 4,316,096
[45] Feb. 16, 1982

[54] WIND POWER GENERATOR AND CONTROL THEREFORE

[76] Inventor: Charles D. Syverson, 2007 Roe Crest Dr., North Mankato, Minn. 56001

[21] Appl. No.: 950,009

[22] Filed: Oct. 10, 1978

[51] Int. Cl.³ ............................................. F03D 7/02
[52] U.S. Cl. ...................................... 290/44; 290/55; 416/13
[58] Field of Search ...................... 290/43, 44, 54, 55; 416/10, 13, 15; 310/67

[56] References Cited

U.S. PATENT DOCUMENTS

| | | | |
|---|---|---|---|
| 2,179,885 | 11/1939 | Fumagalli | 290/55 |
| 2,207,964 | 7/1940 | Albers | 416/13 |
| 2,303,441 | 12/1942 | Donlon | 416/13 |
| 2,309,283 | 1/1943 | Thiesen | 416/10 |
| 3,564,306 | 2/1971 | Ott et al. | 310/67 X |

Primary Examiner—B. Dobeck
Assistant Examiner—W. E. Duncanson, Jr.
Attorney, Agent, or Firm—Kinney, Lange, Braddock, Westman and Fairbairn

[57] ABSTRACT

A wind powered generator for generating electrical energy comprising a generator which has no slip rings between its field and armature, and which when mounted on a tower is controlled through suitable control mechanism to adjust the power output to a level compatible with the load and storage equipment, as well as the existing wind conditions. The control apparatus will prevent overloads and will provide for efficient utilization of available wind. The controls operate mechanism to vary the angle of interceptance of the propeller with the wind. The device is made to be relatively maintenance free and capable of unattended generation of electricity over extended periods of time.

27 Claims, 10 Drawing Figures

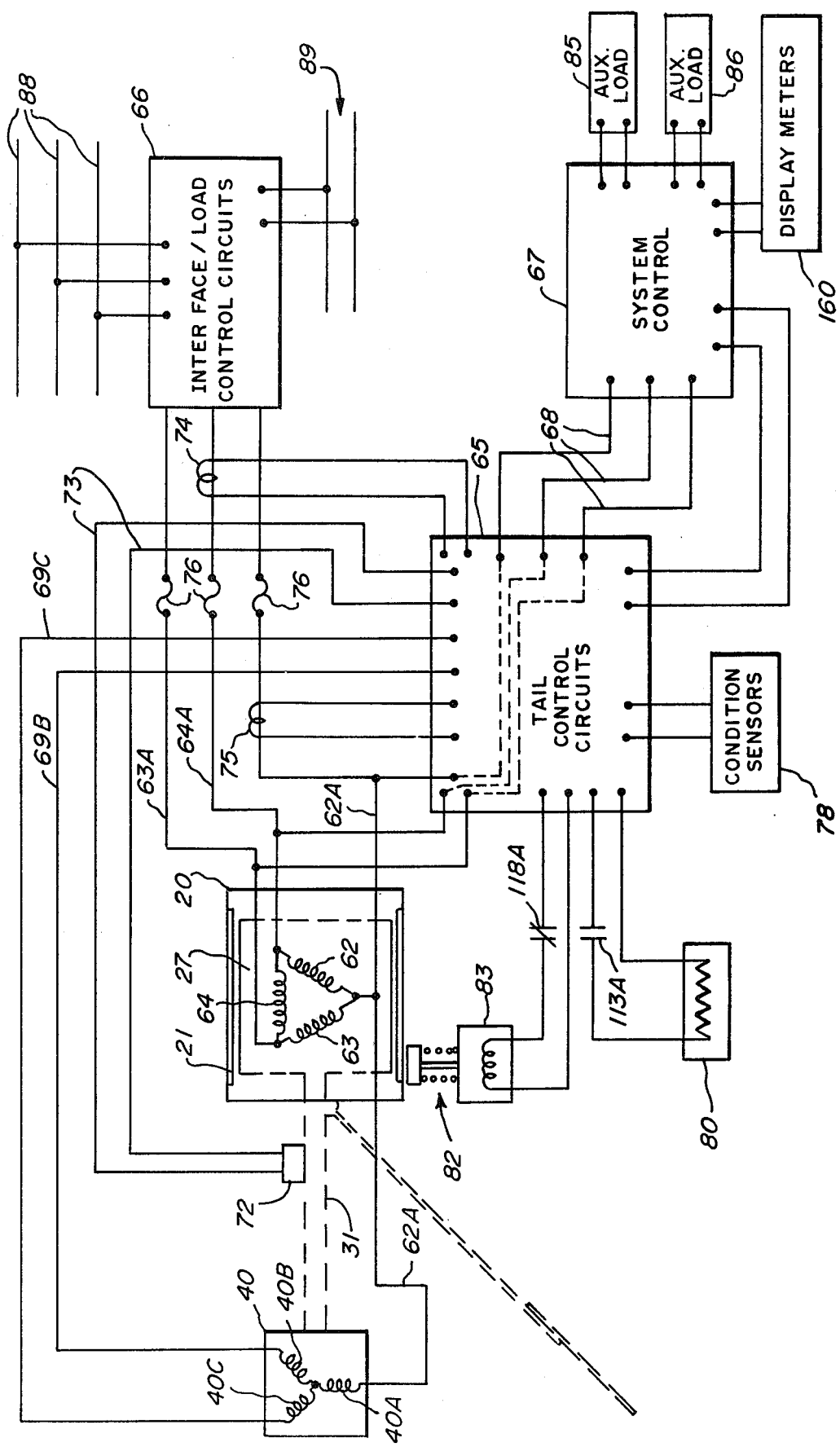

FIG. 7
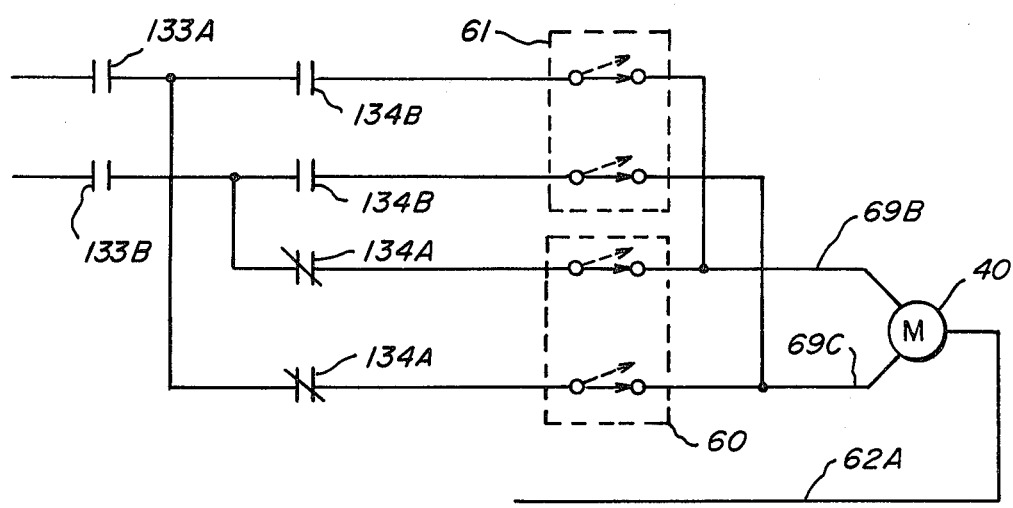
FIG. 8
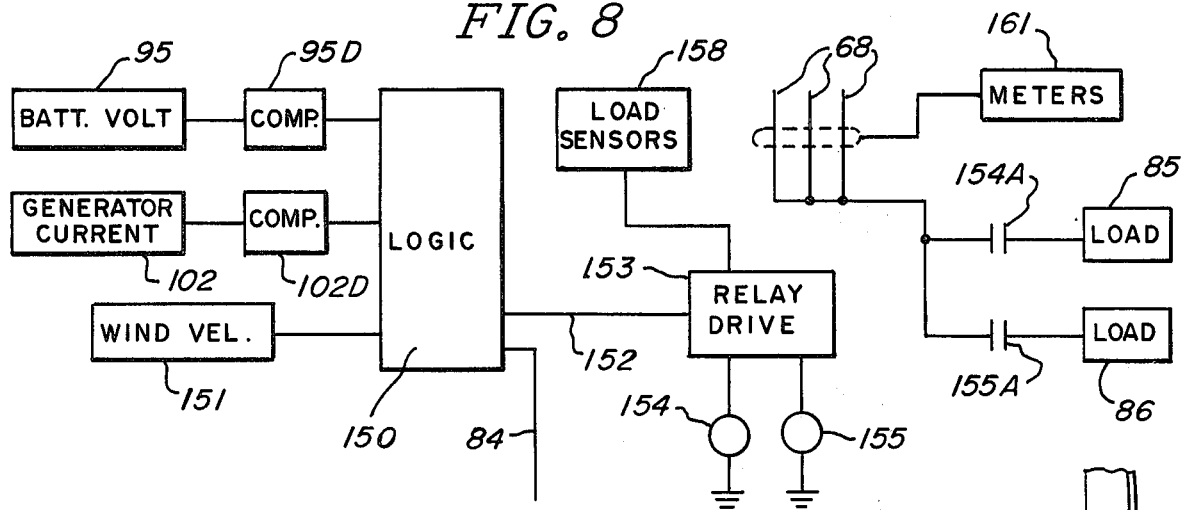
FIG. 9
FIG. 10
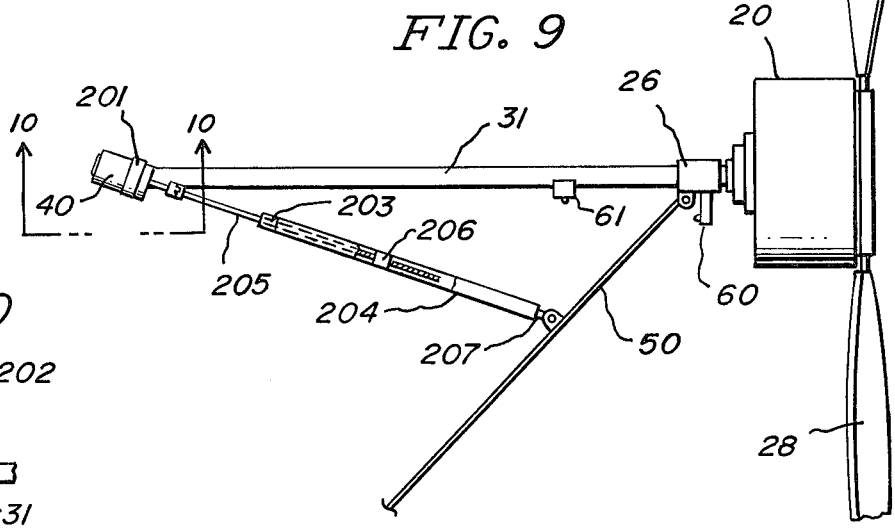

WIND POWER GENERATOR AND CONTROL THEREFORE

BACKGROUND OF THE INVENTION

1. Field of the Invention

The present invention relates to wind powered electrical generators, and mountings and control systems therefore.

2. Prior Art

Various wind powered mechanisms have been utilized for years, including water pumping and also DC generators that were widely used on farmstead lighting plants in the past. With petroleum based energy becoming more and more expensive, and also with the concentration of interest in minimizing the pollution of air during power generation, the advent of supplemental, or even primary electrical power to be provided by windmills has become more feasible economically, as well as more desirable from the pollution reduction standpoint.

A paper entitled "Wind Power" authored by Charles D. Syverson, the inventor herein, and John G. Symons, Jr. was published in 1974 and related to parameters and technical information concerning the provision of electrical power through wind generators. The booklet was distributed by the authors operating under the name "Wind Power", Box 233, Mankato, Minnesota 56001.

The problems associated with wind generated electrical power primarily relate to the need for maintenance and control. The propellers that drive the rotating components must be capable of operating in a wide range of wind speeds, and also must be designed or controlled in some manner to keep from exceeding design limits relating to the propeller rpm, maximum generator current output, the load, and the state of charge of the storage batteries (where such batteries are used). Also, the maximum permissable battery bank charging current or load current must be observed in widely varying wind conditions.

Insofar as maintenance is concerned, the greater the reduction of maintenance, the more usable a wind powered generating system becomes. It is desirable to have a design which will allow totally unattended operation for long periods of time such as weeks or months, and in some instances even years.

SUMMARY OF THE INVENTION

The present invention relates to a wind powered generator mechanical arrangement and control. The generator comprises a propeller having a directly coupled rotating field comprising permanent magnets mounted in a rotating housing. The stationary armature in turn is supported on a suitable tower support and is mounted to permit it to rotate about a vertical axis to permit the propeller to be properly oriented with respect to the direction of the wind. On the opposite side of the vertical mounting axis from the propeller a suitable control and counterweight arm is mounted providing a balanced support for the generator. A vane or tail is mounted for pivotal movement about a vertical axis relative to the counterweight arm, and its angle relative to the counterweight arm and relative to the axis of rotation of the propeller can be varied in response to certain parameters that are being sensed.

The vane controls the position of the propeller axis relative to the wind and thus may prevent excessive current from being generated; prevent overspeed; prevent overcharging storage batteries, if such are being used, and prevent the unit from providing excessive charging currents.

The use of a rotating field and a stationary armature, particularly in connection with a permanent magnetic field, precludes the need for having slip rings between the relatively rotating portions of the generator for excitation or for transferring the generated current from the generator. While slip rings and brushes are needed for transferring the generated current across the rotating joint of the entire head (about the vertical axis), the amount of rotation is limited and relates only to changes in position of the propeller that might be occasioned by adjusting the vane or tail as will be explained, and also the rotation of the head which might be occasioned by changing of wind direction. Thus the slip rings do not have to rotate continuously at relatively high speeds, and the problems normally associated with slip rings are thus greatly reduced.

The adjusting vane is controlled through a motor which is powered in response to signals indicating the state of selected conditions.

Various safe guards are included in the arrangement including dynamic braking to impose a load on the generator for safety purposes, and a mechanical brake to stop rotation if necessary. The unit is designed to eliminate unnecessary short term adjustments of the vane by providing suitable time delay circuits, so that only smooth non-oscillatory operation results.

The device may be mounted on a suitable high tower, and can have propeller diameters ranging from about two feet to about 50 feet. The energy storage can be in batteries, heat storage, hydrogen gas, compressed air or other means of utilizing AC or DC electrical energy such as direct connection to a utility line. The voltage range of course can be as desired.

BRIEF DESCRIPTION OF THE DRAWINGS

FIG. 4 is a schematic representation of the wind power generating apparatus of the present invention showing schematically certain of the interlocks for controlling the device in an alternating current generating system;

FIG. 7 is a schematic detail of a switch arrangement for a tail control motor used with the device of the present invention; and FIG. 8 is a block diagram of a typical system control module used and represented in FIGS. 4 and 5.

FIGS. 9 and 10 show a modified arrangement for the drive used to change the angle of the vane assembly relative to the mounting frame.

DESCRIPTION OF THE PREFERRED EMBODIMENT

Figure 1:
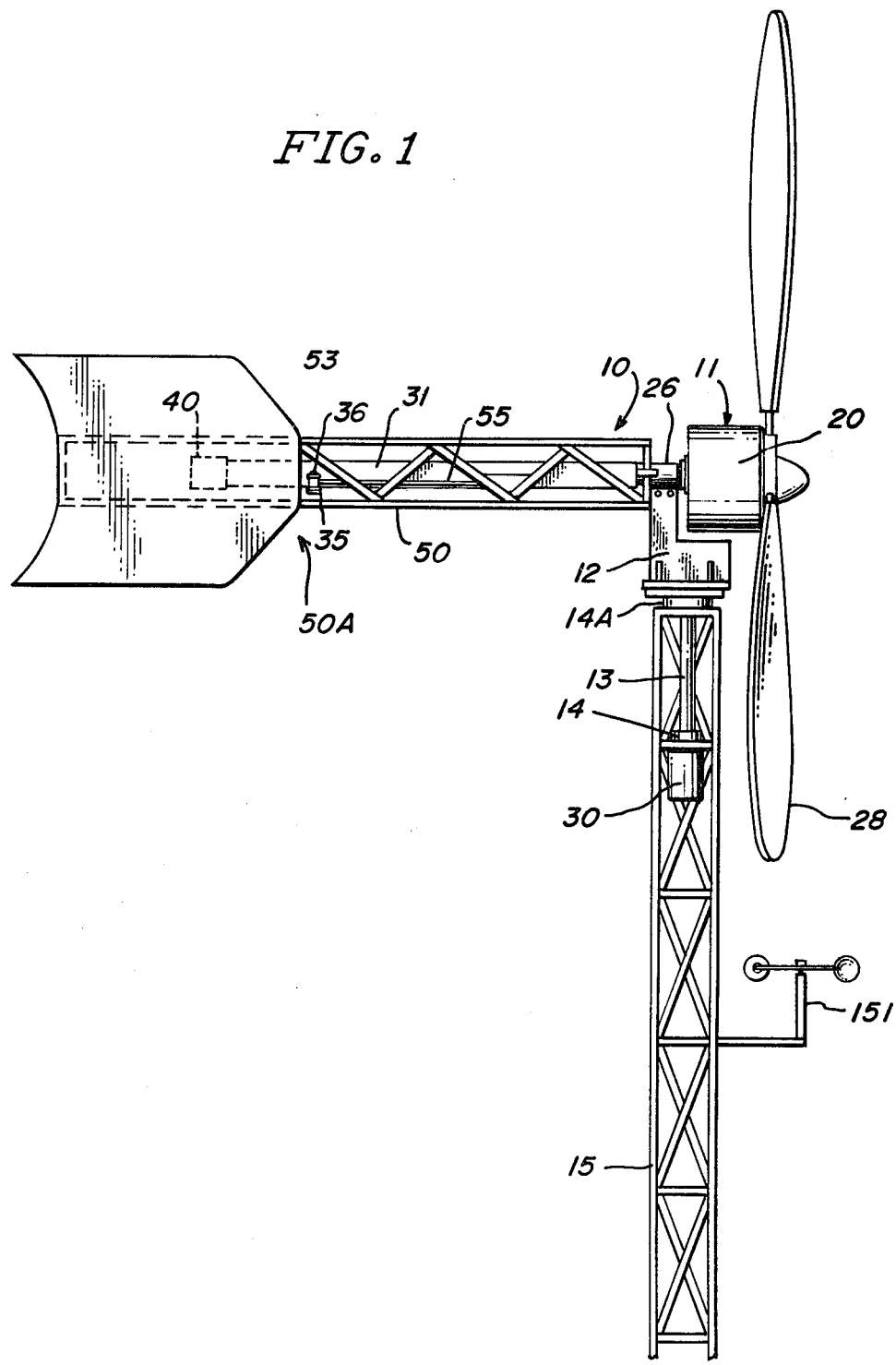
FIG. 1 is a fragmentary side view of a typical wind generator tower showing a wind generating apparatus made according to the present invention installed thereon.

A generating apparatus made according to the present invention illustrated generally at 10, and comprises a generator assembly illustrated generally at 11, that is mounted through a bracket assembly illustrated at 12 to a rotating tube member 13, that is mounted in a suitable pair of vertically spaced bearings illustrated at 14A and 14, and is free to rotate with respect to a tower or support assembly 15. The tower 15 may be a free standing tower that is supported on the ground, or it can be a stub tower mounted on the top of the building. The tower height is selected to achieve the maximum utilization of the wind that is available and can be of any desired construction. It should be noted that the bracket 12 is mounted to the top of the tower through a bearing 14A which carries thrust as well as radial loads, and the lower bearing 14 is a radial bearing that guides the tube 13 for free rotation about a generally upright axis.

Figure 2:
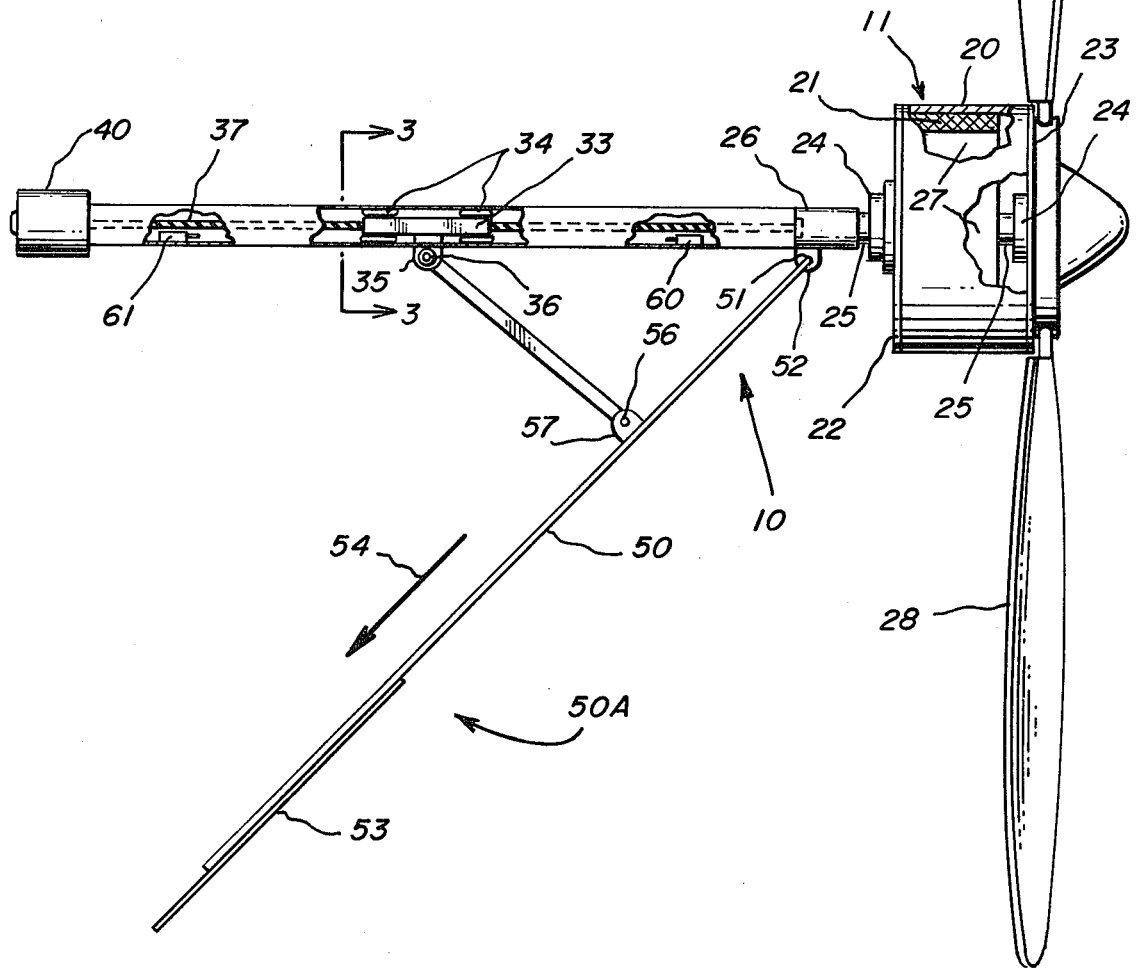
FIG. 2 is a top plan view of the device of FIG. 1.

The generator assembly is shown partly in section in FIG. 2, and as shown has a rotating field made up of permanent magnets 21. The rotating field magnets 21 are attached to and mounted on the interior of a cylindrical housing 20. The housing 20 has end plates 22 and 23, which in turn are rotatably mounted through suitable bearings 24 with respect to an armature shaft 25. The armature shaft 25 in turn is fixedly mounted into a hub 26. The hub 26 forms part of the bracket 12, at the upper end thereof, and the bracket 12 is suitably fixed to the rotating vertical tube 13.

The armature shaft 25 supports a fixed or non-rotating armature 27 that is held within the rotating housing 20. The armature is suitably wound in a known manner for providing the desired type of power (three phase etc.). Preferably, three phase power will be generated. The number of field magnets and the positioning of the magnets will be arranged to provide the desired frequency and phase relationship of the output power. Because the armature is non-rotating relative to bracket 12 and tube 13, the lead wires from the armature windings can pass through a suitable passageway in the shaft 25, and then down through the bracket 12 and into the tube 13. The tube 13, as stated, does rotate under wind direction changes and the like, and thus a slip ring connection 30 is necessary to carry power to the tower and fixed structure. This slip ring assembly 30 can be a conventional design because the only rotation is relatively infrequent and slow speed movement of the generator assembly about its upright axis due to changes in the wind or the angle of the blade with respect to the wind.

A propeller 28 is mounted to a suitable hub on the end plate 23 opposite from the bracket hub 26. The propeller size and shape may be selected to suit the existing conditions. The wind acting on propeller 28 causes rotation of the housing 20 and field magnets 21.

Figure 3:
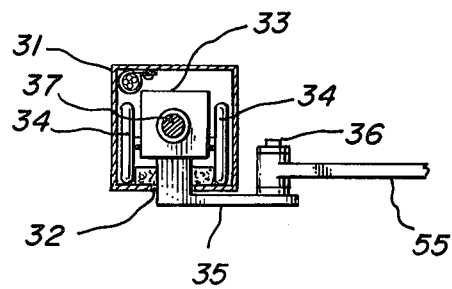
FIG. 3 is a sectional view taken as on line 3—3 in FIG. 2.

The bracket 12 also supports a counterweight balance arm indicated at 31. The axis of the balance arm is centered on the axis of the shaft 25 and extends outwardly from the bracket 12 on the opposite side of the vertical pivot axis of tube 13 from the generator assembly. The counterbalance arm 31, as shown perhaps best in FIG. 3 has a cross section that forms a track. A slot indicated at 32 is provided in the lower wall thereof. A carriage 33 is mounted inside the track or arm 31. The carriage is mounted on suitable wheels 34 or on slide bearings. The carriage has an attached carriage arm 35 which extends through the slot 32 to the exterior of the arm 31. The arm 35 as shown in FIG. 3 extends laterally from the counterbalance arm 31. The carriage arm 35 has a portion extending along side the counterbalance arm 31 and an upright pin 36 is mounted to the outer end of arm 35.

The movement of the carriage 33 along the counterbalance arm 31 is controlled through the use of a threaded rod 37 which is rotatably mounted in a suitable bearing adjacent the sleeve 26, and is threadably mounted through a threaded interior opening in the carriage 33. The opposite end of the threaded rod or screw 37 is drivably connected to the output shaft of a three phase, fractional horsepower motor indicated generally at 40 that in turn is suitably mounted to the outer end of the counterbalance arm 31. The three phase motor 40 is driven in selected direction (by reversing two leads) to cause the carriage to move longitudinally along the counterbalance arm at desired time. A suitable weight may be placed at the outer end of the counterbalance arm, (which could include the weight of the motor 40, plus additional weights that are necessary) to counterbalance the weight of the generator assembly about the axis of the pivot tube 13. The propeller 28 is a fixed pitch propeller, and is not a variable pitch propeller. Variable pitch propellers are relatively hard to control and require a good deal of power to control and also the controls require a good deal of mechanism. Complex mechanism always leads to more maintenance and thus elimination of the need for variable pitch simplifies the structure and tends to reduce required maintenance.

To control output of the fixed propeller, the relative position of the rotational axis of the propeller is controlled. The rotational axis coincides with the longitudinal axis of the counterbalance 31. The relative wind position is controlled by a vane or tail assembly indicated generally at 50A. The tail assembly including a frame 50 is pivotally mounted as at 51 about an upright axis to a bracket 52 attached to the mounting bracket 12. The tail assembly 50A as shown is a lightweight frame that extends outwardly from this pivot. A tail plate or vane 53 is mounted at the outer end of the tail frame 50, and of course has a large enough surface area so that as the wind blows it will tend to cause the tail frame 50 to align with the direction of the wind. For example, as shown in FIG. 2 the wind is indicated by the arrow 54.

The position of the tail frame 50 about the pivot 51 and therefore relative to the counterbalance arm 31 is controlled by the carriage 33 and motor 40. The pin 36 on arm 35 as shown has a link 55 pivotally mounted thereto, and the link is also pivotally mounted as at 56 to a bracket 57 mounted on the tail frame 50. As the carriage 33 is moved along the arm 31 by operation of motor 40 and screw 37, it can be seen that the tail frame 50 will be caused to pivot outwardly from (or toward) the counterbalance arm and therefore the relationship of the axis of rotation of the propeller 28 with respect to the wind direction will change. The wind will tend to align the tail vane 53 parallel to the direction of the wind in a normal manner.

As will be understood, by proper sensors and control, efficient utilization of the energy developed by the wind will be possible, and further, overcharging, excessive current generation, excessive speed and other parameters may be controlled.

The driving of the carriage along the arm which forms a track for the carriage will usually be done under power generated by the generator 11. To prevent overtravel of the carriage in either direction, suitable limit switches are utilized and these are shown schematically at 60 and 61 in the drawings. The limit switches are placed inside the arm 31 in a position to be contacted by the carriage 33 when the carriage has reached its desired extent of travel along the counterbalance arm.

It should also be noted that a sealing strip can be used along the slot 32 in arm 31. The sealing strip may fit tightly around the arm 35, and yields to permit the arm to move. The seal would have resilient lips that would close together to keep foreign material out of the track.

Referring to FIG. 4 in particular, a system schematic diagram is displayed for an alternating current supplementary system. The rotating housing 20 is illustrated, and also the magnets 21 are illustrated in the rotating housing only schematically. The armature 27 is shown in place, and the counterbalance arm 31 and related elements are also shown for orientation purposes.

The armature 27 is wired to provide a three phase generator, and includes a first phase winding 62, a second phase winding 63, and a third phase winding 64 shown schematically. The electrical output is provided along the lines 62A, 63A and 64A, respectively. The line 62A extends to the tail control motor 40, and energizes one winding indicated at 40A of this three phase motor in the form of the invention shown. Note that as shown, the generator is connected in a standard delta connection, while the motor is a Y connection motor. In its simplest form the lines 62A, 63A and 64A are connected to tail control circuits 65 and also to the load control circuits 66. Systems controls indicated at 67 are also connected to the tail controls.

The tail control circuits are shown only as a block diagram in FIG. 4, but include suitable relays and other controls to provide power from lines 63A and 64A to properly connect the lines to additional lines 69B and 69C, which in turn are connected to windings 40B and 40C, respectively. The limit switch and reversing connections are not shown in FIG. 4 for purposes of clarity. As will be explained the connection of lines 69B and 69C is such that the proper direction of rotation of the motor 40 is achieved to provide the control necessary.

Additionally, a vibration sensor shown generally at 72 can be provided on the counterbalance arm 31, and is connected by suitable lines 73 to the tail control circuits. This vibration sensor would be utilized to close down the system if it starts to shake apart, or to adjust the tail motor to minimize vibrations.

A current transformer indicated generally at 74 is provided on line 64A, and a current transformer 75 is provided on line 62A. These current transformers are utilized to sense the amount of current being generated by the generator and used for controls. The lines 62A, 63A and 64A may have suitable fuses shown at 76 therein as well. The tail control circuit has inputs such as condition responsive sensors indicated generally at 78, in FIG. 4. The tail control circuits include various components to sense the conditions that are provided by the current transformers and the input condition sensors 78.

One of the features of the present invention is that the generator may be dynamically braked by placing a large resistor into the output circuit of the generator. In order to have such dynamic braking a large resistor 80 is provided and it is controlled from the tail control circuit through suitable relays as will be more fully explained.

Additionally, after dynamic braking has taken place, that is braking which will tend to load the generator and slow the rotation of the rotating housing, a spring loaded, normally applied mechanical brake illustrated schematically at 82 is provided. The brake can take a desired form, such as a band or block which engages the rotating housing, and the brake can be controlled by a solenoid 83 which may normally be energized to hold the brake released. Automatic controls and sensors may open contacts 118A to deenergize the brake solenoid when conditions sensed indicate a shut down is desired, but as shown a manual switch may also be used.

The system control circuitry includes sensors to provide for connection to auxiliary loads if excessive current or voltage is being generated. Further, a tail motor control feedback signal may be provided to tend to return the vane to position to obtain maximum output. A first auxiliary load 85 or a second auxiliary load 86 may be used to store or utilize electrical energy being generated.

Additionally, display monitors (meters) can be provided to indicate conditions. These may include lights or meters to show frequency, current, voltage and the like.

The output of the generator acting through the utility interface module 65 can provide power directly to a three phase utility line as indicated generally at 88, or if desired to a single phase utility line indicated generally at 89. The interface connections are identical to existing equipment, which will tie in auxiliary generators from a power plant when needed.

The components used for sensing current and the like also are of conventional design. The relays for sensing load conditions and connecting the auxiliary loads to the system also are conventional. The controls operate with logic level signals with very low current consumption and may drive suitable amplifiers to carry out switching.

Figure 5:
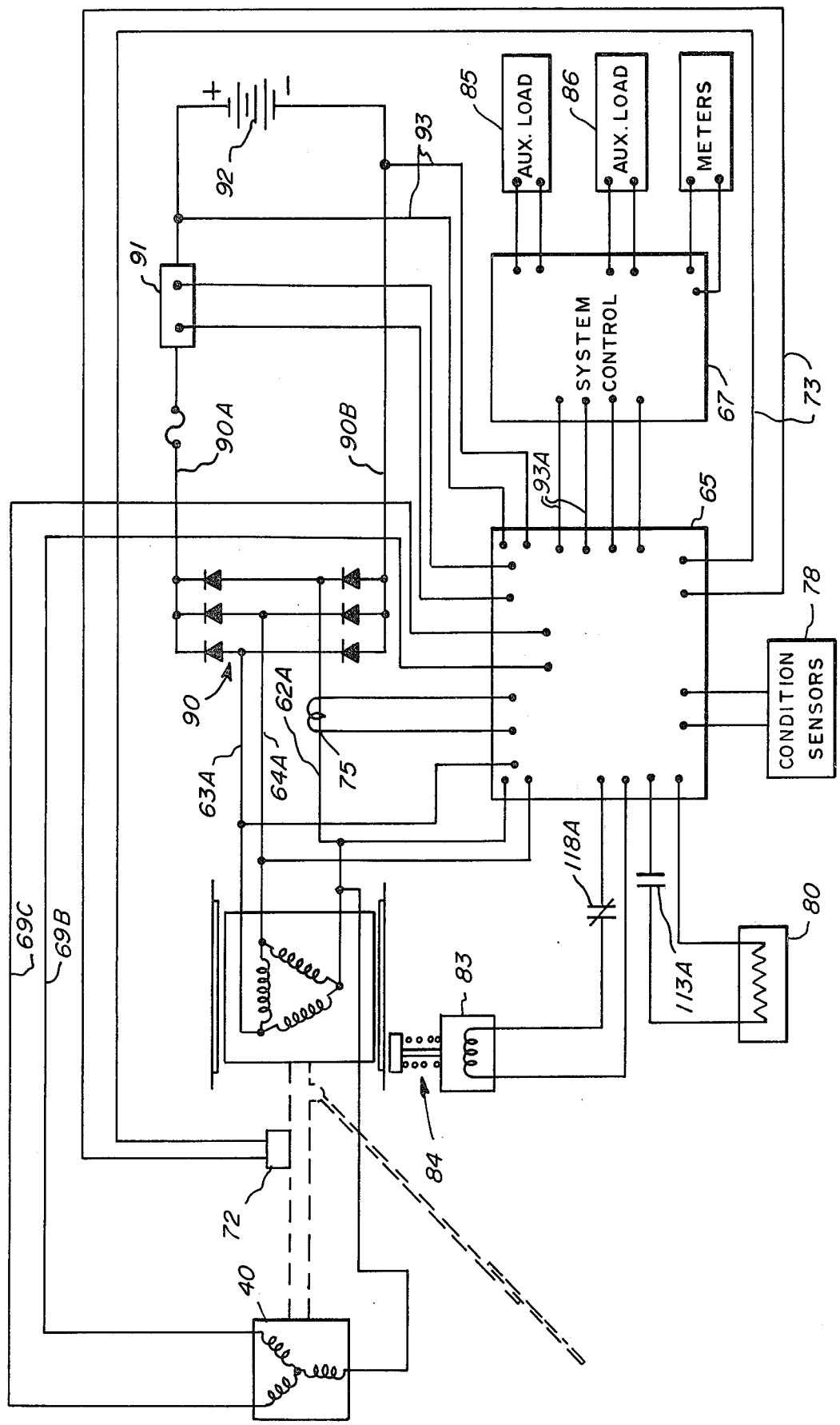
FIG. 5 is a schematic representation similar to FIG. 4 except in a direct current generating system.

Referring to FIG. 5, a system diagram is provided for the wind generator of the present invention used with a direct current load such as a battery bank that has to be charged. The generator components are substantially the same as shown in FIG. 4, except that a rectification circuit indicated generally at 90 is provided at the output lines 62A, 63A, and 64A, and the DC output is provided along lines 90A and 90B. The lines 90A and 90B are connected to a battery bank 92 (or a DC load of some type). The current in line 90A may be sensed with a current sensor 91, and the current signal provides a control signal to the tail control circuit. The current sensor 91 of course is a DC current sensor. Further, the battery voltage can be sensed across lines 93, which are connected to lines 90A and 90B. The battery voltage signal can be provided to the tail control circuit as well. The other components are the same and are numbered alike in FIGS. 4 and 5.

Figure 6:
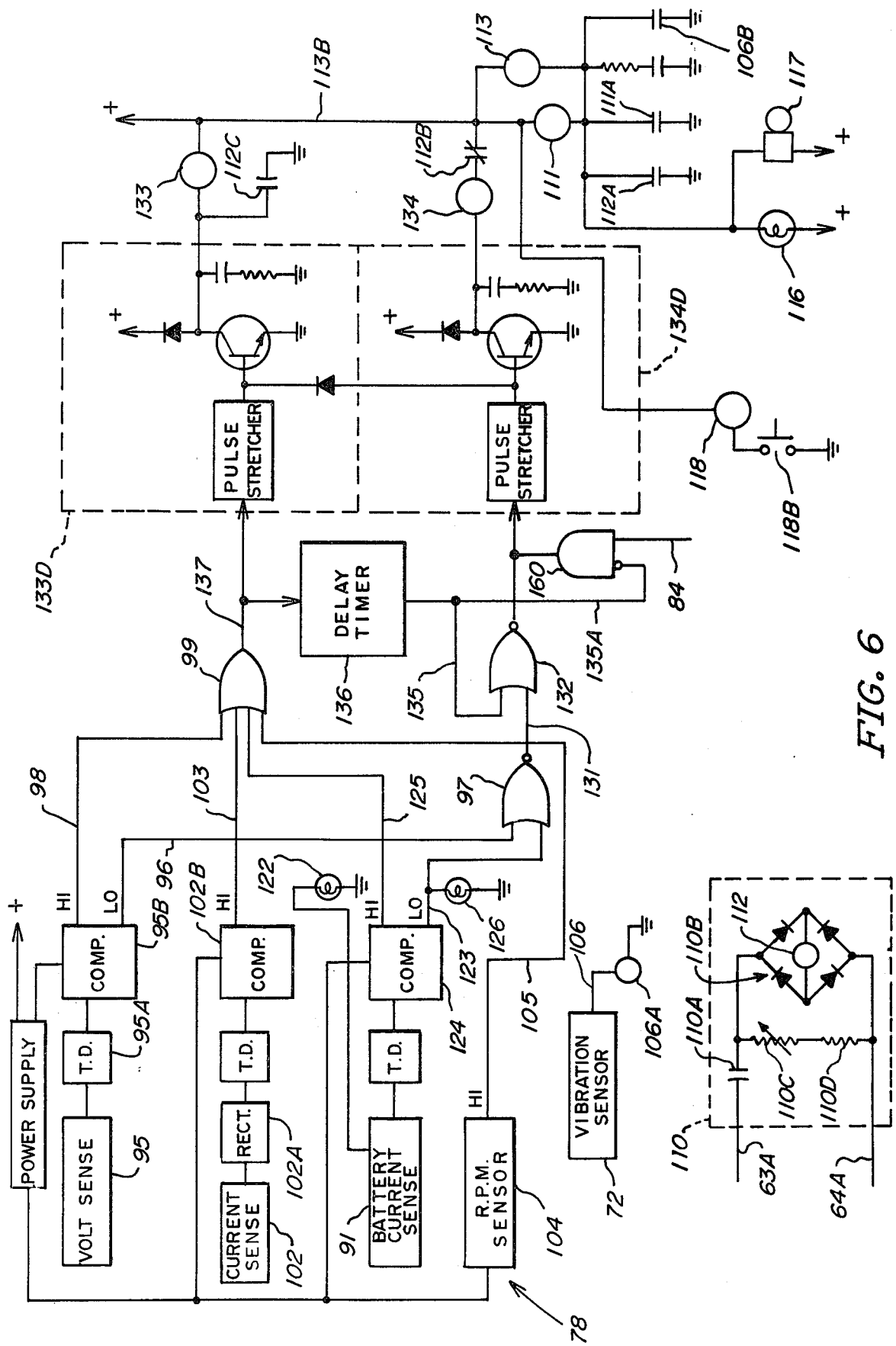
FIG. 6 is a more detailed block diagram of the tail motor control module showing the various functions of such module.

In FIG. 6, the schematic diagram of the tail motor control circuitry is shown. The inputs include inputs that relate to both AC and DC systems, but only the appropriate sensor would be used with each system.

With modern solid state circuitry, logic level signals can be provided with relatively little current flow through sensors. The battery voltage sensor 95 used with a DC system for example can be combined with a time delay 95A and comparator 95B. The comparator then compares the actual sensed voltage of the battery with respect to a reference from a stabilized power supply 94. The comparator provides a logic level "one" signal along line 96 when the battery voltage is lower than desired. This signal is provided to a first input of a NOR gate 97. If the battery voltage is higher than the reference, a logic level high signal is provided along a line 98, to one input of a multiple input OR gate 99. The power supply may be a battery if desired. The control components are generally mounted on the ground and the necessary signals are carried across slip rings in assembly 30.

A generator current sensor 102 utilizes the current sensed by one of the current transformers shown in FIG. 4 for example, and incorporates a rectifier 102A and comparator 102B. The sensed current may also be reduced in voltage through a transformer before rectification. The AC current is rectified, and then compared with a reference from the power supply 94 and if the generator current is above a desired level, a logic level "one" or high signal is provided along a line 103 to a second input of the OR gate 99. The circuit also may have a time delay as may all of the sensors to prevent chatter or oscillation from instantaneous current or voltage surges.

An rpm sensor 104 such as a standard frequency sensing tachometer circuit is used to sense the alternating current output frequency of the generator. The sensor includes a comparator so that if the frequency of the signal from the tachometer is higher than the desired rpm, a high logic level signal would be provided along the line 105 to another input of the OR gate 99.

Vibration sensor 72 is designed to provide a suitable signal if the amplitude of vibration is greater than a desired level. This "excessive vibration" output is provided along a line 106 to energize a relay 106A through a suitable relay driver. The relay 106A controls contacts 106B.

An "overspeed" fail-safe alternating current relay indicated generally at 110 can also be utilized to provide an input control signal. The output frequency of the generator may be sensed from lines 63A and 64A by a suitable capacitor 110A connected to the diode bridge 110B also connected to line 63A and 64A. Suitable resistors 110C and 110D are connected across the diode bridge and lines 63A and 64A. If the generator overspeeds, the diode bridge provides an output that energizes a relay 112 which operates contacts 112A, 112B and 112C to initiate dynamic braking and suitable alarm circuits if desired, and also to disable the motor 40 as will be explained. Closing contacts 112A will energize a relay 113 which controls contacts 113A shown in FIGS. 4 and 5 to close the contacts and to thereby connect the dynamic brake resistor 80 into the load to slow down the generator unit. The contacts 106B also energizes relay 113 to connect the dynamic brake resistor to the generator output if the vibration becomes excessive. The relay 113 may be connected through a series resistor and capacitor as shown to ground.

Power supply 94 or a separate power supply or battery may provide a voltage (indicated by plus signs on lines) for energizing the relays. Relay 113 for example is connected to a line 113B carrying power to relay 113. When either contacts 106B or 112A close, the relay circuit is grounded and relay 113 energized. This also energizes a relay 111 which locks on relay 113 by closing contacts 111A. Normal reset is necessary to drop out the relay 111.

When the contacts 106B or 112A are closed an indicator light 116 will be energized to show that something has gone wrong, and also an alarm bell 117 may be activated for example. A relay 118 is manually operated by a switch 118B to open contacts 118A leading to the brake solenoid and to thereby deenergize the brake solenoid. The contacts 118A are normally closed and whenever the control power is on the manual brake solenoid is energized to release the brake. The manual brake is thus a fail-safe device.

In a direct current system such as shown in FIG. 3, battery current is sensed with sensor 91 (such as a meter relay). The sensor 91 is also connected to a time delay and to a comparator 124. When the batteries are being charged an indicator light 122 will light. If the charging rate is greater than desired, the comparator provides a high logic level signal along a line 125 to a further input of the OR gate 99. If the batteries are discharging a level logic level "one" signal may be provided on line 123 to one input of NOR gate 97. A discharge indicator lamp 126 also can be provided for connection to the output of the current sensor to indicate discharging condition for the batteries.

When either of the inputs to the NOR gate 97 for example are "one", either because of a low battery voltage, or because of a battery current sensor being low, the output along a line 131 will be low and this is fed into one input of a second NOR gate 132. The NOR gate will provide a high output signal only when both of its inputs are low. When both inputs are low the output of NOR gate 132 will act to energize a relay 134 through line 113B and a relay drive circuit 134D. The relay 134 operates reversing contacts 134A and 134B shown in FIG. 7 to control direction of rotation of the tail control motor to increase the interceptance of the unit with the wind when the relay 134 is energized. The driver 134D includes a pulse stretcher circuit (a three second latch for example) and a transistor that conducts to ground when the base receives the pulse from gate 132. The relay 133 which controls contacts 133A and 133B (see FIG. 7) is controlled by a relay driver 133D. The pulse from the pulse stretcher circuit of driver 134D is connected through a diode to the base of the transistor in the driver circuit 133D. Thus the pulse relay 134 also actuates relay 133, closing contacts 133A and 133B and the motor 40 is energized. The screw is then driven to drive the carriage 33 away from the generator housing, which swings the vane 53 toward the arm 31 to increase the interceptance of the propeller into the wind.

In order to prevent instantaneous operation of the tail control motor each time an output from a sensor is received, and thus to avoid jerky, multiple corrections which waste power, time averaging is utilized and the interception of the propeller with the wind is not increased unless for a selected time no signals requiring or calling for decrease of interception have been received. To accomplish the averaging the other input of the NOR gate 132 other than from NOR gate 97 is along a line 135 which normally carries a low (0) signal to the gate 132. The line 135 carries a high ("one") signal as an output of a thirty minute averaging timer 136. If the output of OR gate 99 has been "high" during a selected preceding time period. The time period of timer 136 may be adjusted to suit the desired operation. The timer is made to smooth out instantaneous pulses that may occur, so that a signal to initiate the tail control motor to drive in direction to increase wind interceptance will not be provided until it is determined that no signal from OR gate 99 had existed for a desired length of time. The input of the timer 136 is on the output line 137 of the OR gate 99. Thus if the OR gate 99 provides an output the timer will be energized and the inhibit signal will not permit a increasing wind interceptance until no signal has been present for a desired length of time. The relay driver 133D is energized by the pulses from OR gate 99 to decrease wind interceptance. The driver 133D includes a pulse stretcher circuit and transistor as well. The decrease relay 133 will be powered from anyone of the high signal inputs to OR gate 99.

It should also be noted that the relay 133 will be energized directly through line 113B and contacts 112C when an overspeed occurs which energizes relays 112. Thus for safety the wind interceptance will be decreased to effectively shut the generator down.

In FIG. 7, the schematic representation of the reversing circuit and the contacts used for controlling a tail control motor are illustrated. The tail control motor 40 has its windings connected across a reversing set of contacts controlled by relay 134. These contacts are shown at 134A (normally closed), and 134B (normally open). With relay 134 energized, the rotation of the tail control motor 40 is to increase wind interception. The limit switches are also shown in circuit schematically in FIG. 7 and are numbered the same as the other figures.

The relay 133 controls the actual power contacts indicated at 133A and 133B in FIG. 7 as well. These contacts are in lines 64A and 63A which connect to lines 69B and 69C. The third phase line of the tail control motor is always connected to one phase lead (62A) of the generator.

The system control circuitry is used to detect load from power lines 68 (in the AC form) and on lines 93A in the DC system and to connect the power lines to auxiliary loads, as well as to determine if the generator is operating at maximum output in relation to the wind. Because these controls are conventional they are shown schematically. A battery voltage sensor signal (in the DC system) for example, from sensor 95 is fed through a suitable time delay to a comparator 95D. Also generator current sensor 102 may provide a time delayed, rectified signal to a comparator 102D. These signals may be properly weighted in relation to one or more reference voltages provided to the comparators. There may be several reference inputs with different outputs to indicate different levels of generator output or battery voltage. The outputs of the comparators 102D and 95D are provided to a logic circuit 150.

An electric ammeter or wind velocity sensor 151 also is used and provides outputs in digital form to the logic circuit 150. The ammeter is mounted on or adjacent the tower for the generator. The logic is programmed to evaluate the wind velocity signal in relation to battery voltage and generator output, and if the battery voltage is low and the generator output is not at a desired level for a given wind velocity a signal comprising a system feedback signal on line 84 may be used to initiate a drive signal for the tail control motor. Such signal line may be connected to one input of an AND gate 160 which has a second input, an inverting input, connected to line 135 through a line 135A. If the signal on line 135 is low the connected input of AND gate 160 will be high. With a high signal on line 84 the AND gate output will be provided to driver 134D to increase the wind interceptance, unless other signals from OR gate 99 inhibited AND gate 160.

The output of logic circuit 150 on a line 152 may be used to energize a relay drive circuit 153 and energize a relay 154 to close contacts 154A and connect auxiliary load 85 to the output lines 68 (or 90A and 90B). After a suitable time delay or from another signal suitable relays 155 may be energized to close contacts 155A to connect auxiliary load 86 into the circuit. The relay drive 153 may also be energized by load sensors 158. The adding of auxiliary loads by logic 150 may be programmed as a result of a determination that the wind velocity sensed is great enough to provide more output than needed by the existing loads.

Suitable meters 161, such as ammeters, volt meters or frequency meters (AC only) also are connected to the generator output lines in the system control circuit.

The circuits used may all have time delays built in to smooth out operation.

As an additional safety feature, the power supply 94, or any battery used for power to the controls may be monitored and if failure occurs the alarm circuit will be activated and also contacts such as contacts 112C may be separately closed to decrease interception to a minimum and prevent uncontrolled operation.

Multiple generators may be used as sequential add on units to operate in parallel as load is added. The controls disclosed inherently regulate the output of each generator to prevent damage from overspeed, over load and the like, and the control of wind interceptance by motor 40 provides a control to equalize the output from each of a plurality of generator assemblies.

In FIGS. 9 and 10, a modified arrangement for the drive used to change the angle of the vane assembly relative to the mounting frame is shown. The frame member 31 is made as previously described, except it can be a closed tube with no slot in the bottom. The frame 50 for the vane assembly is pivotally mounted to the bracket 26 as previously shown. The rotating housing 20 and the propeller 28 are previously described as well.

The frame 31 has a pin 200 rotatably mounted about an upright axis at the outer end thereof. The pin 200 in turn has a bracket 201 which is mounted onto the outer housing of the motor 40. The bracket 201 and pin 200 permit the motor 40 to pivot about a vertical axis relative to frame 31, while supporting the motor adequately for operation. The output shaft 202 of the motor 40 is drivably connected to the outer end of a threaded rod 205, which is mounted in a suitable bearing 203 and is thereby guided into a tube 204. The tube and threaded rod take the place of the link 55 in the previous form of the invention. The end of tube 204 adjacent frame 50 is closed (sealed) and has a connector 207 pivotally mounted to frame 50. The tube 204 is sealed at its outer end by bearing 203. The threaded rod 205 is threaded through a block 206 fixedly mounted at a suitable location inside the tube 204. Upon rotation of the shaft 202 when the motor 40 is driven, the rod will be threaded relative to the block and the length of the overall link assembly, including the tube 204 and the exposed end of the rod 205 can be changed to cause the angle of the tail frame 50 to change about its pivotal mounting relative to frame 50 and the generator assembly. The use of a tube which is sealed at its outer end, with a rotating threaded rod in the inside for adjusting the angle of the tail provides a long life with minimum maintenance. With a sealed bearing closing up the tube, (the opposite end of the tube is also closed) very little chance of any foreign material causing problems exists.

The mechanical action is substantially identical in each case. Pivoting of the tail vane is controlled by operating a mechanism that changes the angle of the pivoting tail vane about its axis of pivot relative to the fixed frame member.

The threaded rod can be permanently lubricated inside of the tube so that there is no need for external lubrication fittings or the like.

It should be noted that limit switches 60 and 61 are relocated as shown schematically in FIG. 9 to sense the actual position of the vane. The limit switches serve the same function as previously described.

In addition, the basic generator and counterbalance arm with the swinging vane may be strictly manually operated by a mechanical linkage from the ground. Carriage 33 can be spring loaded toward the generator to tend to decrease wind interception, and a cable and pulley arrangement may be operable to manually pull the carriage away from the generator along the balance arm to permit increase of wind interception. The cable control may be operated from the ground through a winch or lever arrangement. The manual control would be analogous to the water pumping windmill controls used in the past. A swivel in the control cable may be used to accommodate rotation of the generator about its upright axis.

The motor 40, the dynamic and mechanical brakes and other relays used may all be manually controlled from the ground by paralleling in manual switches to operate relays, such as relays 133 and 134, or by direct manual switches. Where necessary, the switches would be connected across slip rings to the ground operator's station. The motor 40 may a DC motor if desired.

The automatic controls disclosed permit extended unattended operation. The alarm circuits may be optional, and also the conditions may be monitored from a remote location. For example, the alarm signals may actuate an emergency radio transmitter, or the alarm signals may be carried on transmission lines.

Adding auxiliary load control also may be optional, as is the possibility of connecting more than one generator in parallel for increasing potential maximum output from one location. It should be noted that one generator may act as a lead unit with others picking up load sequentially as needed, or a plurality of generators may operate simultaneously, to satisfy the load demands. Load equalization is achieved by changing the wind interceptance.

The comparators illustrated are preferably operational amplifiers. Integrators may be used to amplify various sensor signals prior to input to the respective comparator amplifiers.

What is claimed is:

1. A wind powered generating system for producing electric power comprising a generator assembly having a rotatable portion and producing an electrical output, means to mount said generator assembly about a generally vertical rotational axis, means to provide wind powered rotation of said rotatable portion of said generator assembly, and a tail control assembly mounted to said generator assembly including a frame and a wind oriented vane adjustably mounted relative to said frame for changing the orientation of the axis of rotation of the rotatable portion relative to the wind direction comprising means to pivotally mount said vane relative to said frame generally about an upright axis, and means between said frame and vane to control the angle of said vane about said upright axis relative to said frame comprising a motor mounted on said frame, a link coupled to said vane at location spaced from the upright axis, drive means coupling said motor to said link to control said link to cause the vane to pivot about the upright axis and means to selectively power said motor as a function of a measured condition including means to connect the motor to be powered by said electrical output.

2. The combination as specified in claim 1 wherein said means to provide wind powered rotation of said rotatable portion of said generator assembly comprises a fixed pitch propeller means.

3. The combination as specified in claim 1 wherein said rotatable portion of said generator assembly comprises a rotating field for the generator, an armature comprising part of said generator assembly being restrained from rotation about the axis of rotation of said rotating field, whereby leads from said armature are directly connected to portions of said means to support said generator assembly without need for slip rings.

4. The combination of claim 3 wherein said rotating field comprises a plurality of permanent magnets mounted on said rotating portion.

5. A wind powered generating system for producing electric power comprising a generator assembly having a rotatable portion and producing an electrical generator output, means to mount said generator assembly for movement about a first generally vertical axis, propeller means to provide wind powered rotation of said rotatable portion of said generator assembly about a second axis, a tail control assembly mounted to said generator assembly including a frame and a wind oriented vane means adjustably mounted relative to said frame for changing the orientation of the axis of rotation of the rotatable portion relative to the wind direction comprising means to pivotally mount said vane means relative to said frame generally about an upright axis, and means between said frame and vane means to control the angle of said vane means about said upright axis relative to said frame including a link and a drive motor operable to change the effective length of the link and change the pivotal relation of the vane means relative to the frame, means to sense conditions variable as a function of the electrical generator output of said generator assembly and to drive said drive motor in response to such sensed condition.

6. The combination as specified in claim 5 and limit switch means to limit the travel of said vane means about its pivot.

7. A wind powered generating system for producing electric power comprising a generator assembly having a rotatable portion and producing an electrical generator output, means to mount said generator assembly for movement about a first generally vertical axis, propeller means to provide wind powered rotation of said rotatable portion of said generator assembly about a second axis, a tail control assembly mounted to said generator assembly including a frame and a wind oriented vane means adjustably mounted relative to said frame for changing the orientation of the axis of rotation of the rotatable portion relative to the wind direction comprising means to pivotally mount said vane means relative to said frame generally about an upright axis, and means between said frame and vane means to control the angle of said vane means about said upright axis relative to said frame including an electric motor powered from the electrical output generated by said generator assembly, and control means for said motor including means to sense current in the electrical generator output and to change the orientation of said vane means about its upright axis to change the angle of the propeller with respect to the wind direction in response to signals from said means to sense current.

8. The combination as specified in claim 7 including means to reversibly drive said electric motor, means to sense the velocity of the wind adjacent said generator assembly and provide a signal indicative of the wind velocity, means to correlate the wind velocity to generator output and to provide a feedback signal tending to drive said motor to increase interceptance of the propeller with the wind to increase propeller speed if the generator output is not at greater than a desired relation to wind velocity.

9. The combination of claim 8 and means to provide a second control signal indicating that generator output should not be increased, and means to prevent the feedback signal from operating said electric motor to increase interceptance of the propeller relative to the wind for a selected time after receipt of said second control signal.

10. The apparatus of claim 8 and auxiliary load means, means to connect the auxiliary load means to receive the generator output in response to sensed parameters.

11. A wind powered electrical generating system comprising a generator assembly producing an electrical output, means to mount said generator assembly in position to intercept the wind, said generator assembly having nonrotatable portions including an armature nonrotatably mounted on said means to mount, a housing rotatably mounted directly on said means to mount about a central axis relative to and radially outwardly of said armature, said housing having supports spaced along the axis and independently rotatably mounted on the means to mount, means carried by said housing radially outward of the armature which interacts with the armature to provide for generation of an electrical output from the armature upon rotation of the housing, propeller means connected to said housing to provide wind powered rotation of said housing relative to the armature to produce an electrical output.

12. The system of claim 11 wherein the means carried by said housing interacts with the armature without sliding electrical connections to nonrotatable portions of the generator assembly.

13. A wind powered generator apparatus having an output circuit for providing output power from a rotating element comprising means to support said apparatus in position to be engaged by the wind, a wind sensitive element connected to the rotating element, said wind sensitive element having an axis of rotation under wind power, and means to adjust the interception of said axis of rotation of said wind sensitive element relative to the wind direction comprising a support member, wind vane means pivotally mounted about a generally upright axis to said support member, and means to adjust the position of said vane means about the upright axis comprising an adjustable linkage, means to connect said linkage between said support member and said wind vane means, and control means operable to adjust said linkage including means sensing variable parameters in the output circuit and means responsive to variations in the parameters to change the angle of said wind vane means about its pivotal axis to adjust the output power to a desired level.

14. The apparatus of claim 13 wherein said control means includes a reversible electric motor and means driven by said motor controlling the adjustment of said linkage.

15. The apparatus of claim 14 and sensor means to sense the status of monitored parameters relating to generation of power by said apparatus, said control means including means to control direction of rotation of said motor means in response to signals from said sensor means.

16. The apparatus of claim 15 including additional sensor means to sense unsafe conditions, and braking means for said rotating element operable in response to a signal from said additional sensor means.

17. The combination as specified in claim 13, and vibration sensor means mounted on said wind powered generator apparatus and means coupled to the vibration sensor means to provide a signal operable to reduce the speed of said rotating element.

18. The apparatus of claim 13, and sensing means to sense at least one of the parameters comprising the speed of said rotating element, the voltage of an electrical device associated with said wind powered apparatus, and the current in an electrical device associated with said wind powered apparatus, and to control the performance of said rotating element in response to signals from at least one parameter of the recited sensing means.

19. A wind powered electrical generating system comprising a generator assembly producing an electrical output, means to mount said generator assembly in position to intercept the wind, said generator assembly including an armature and a field, a central support nonrotatably mounted on said means to mount, said armature being nonrotatably mounted relative to said central support, a housing rotatably mounted relative to, surrounding and radially outwardly of said armature, permanent magnet means mounted on said housing adjacent and radially outwardly of the armature comprising a generator field, said housing having an outer shell and end plate means at opposite ends thereof, bearing means between each end plate means and the central support to effect the rotatable mounting of the housing, and means connected to one of said end plate means to provide wind powered rotation of said housing relative to the armature to produce an electrical output.

20. The combination of claim 19 including an elongated frame mounted to said generator assembly and extending in direction opposite from said means to provide wind powered rotation, and means forming a counterweight on said elongated frame to substantially balance the weight of said generator assembly about said vertical axis.

21. The combination of claim 19 wherein said means to provide wind powered rotation comprises a fixed pitch propeller rotatable about an axis, and means to control the angle of the axis of said propeller relative to the wind direction.

22. The combination of claim 21 wherein the means to control the angle of the axis of said propeller comprises sensor means to sense electrical parameters which are a function of said electrical output.

23. The combination of claim 22 wherein said means to mount comprises means to permit rotation of said generator assembly about an upright axis, and wherein said means to control includes a wind vane adjustably mounted for movement relative to the generator assembly to cause desired orientation of the generator assembly about said upright axis relative to wind direction.

24. The combination of claim 23 and means to adjust said wind vane relative to the generator assembly including an electric motor powered from the electric output of said generator assembly.

25. The apparatus of claim 19 and load means, means to selectively connect and disconnect the load means relative to the electrical output of the generator assembly in response to sensed conditions.

26. The apparatus of claim 25 wherein the load means comprise transmission lines.

27. A wind powered generator apparatus having an output for providing output power from a rotating element comprising means to support said apparatus in position to be engaged by the wind, a wind sensitive element connected to the rotating element, said wind sensitive element having an axis of rotation under wind power, and means to adjust the interception of said axis of rotation of said wind sensitive element relative to the wind direction comprising a support member, wind vane means pivotally mounted about a generally upright axis to said support member, and means to adjust the position of said vane means about the upright axis comprising an adjustable linkage, means to connect said linkage between said support member and said wind vane means including a reversible electric motor, means driven by said motor controlling the adjustment of said linkage to change the angle of said vane means about its upright pivotal axis, means connecting said generator apparatus output to said motor to permit powering said motor from the output of said generator, and control means to control the powering of said motor.

* * * * *